Nov. 3, 1931.   B. J. BLUE   1,830,221

HAND GRIP

Filed May 12, 1930

BENNETT J. BLUE
Inventor

By

Attorney

Patented Nov. 3, 1931

1,830,221

UNITED STATES PATENT OFFICE

BENNETT J. BLUE, OF TUMTUM, WASHINGTON

HAND GRIP

Application filed May 12, 1930. Serial No. 451,713.

My present invention relates to an improve hand grip of the heated type for use on wheels, and particularly adapted to steering wheels for automotive vehicles. As is well known, the driver of such a vehicle, because of the fact that his hands are required for constant control of the wheel, in both open and closed automobiles, has his hands exposed to cold drafts of air, and consequently the fingers of the hands frequently become numbed from such exposure. The primary object of my invention is the provision of a hand grip, used in pairs on the steering wheel and provided with an electric heating element, by means of which the fingers are warmed with heat diffused from the grips.

In carrying out my invention I utilize a pair of split hand grips of rubber or similar resilient material that may be "snapped" over the rim of the steering wheel and which grips are clasped about the rim in such manner as to be retained against accidental displacement.

The invention consists in certain novel combinations and arrangements of parts as will hereinafter be more fully set forth and claimed. In the accompanying drawings I have illustrated one complete example of the physical embodiment of my invention wherein the parts are combined and arranged according to the best mode I have thus far devised for the practical application of the principles of my invention.

In order that the general arrangement and relation of parts may readily be understood I have illustrated a steering wheel having the usual rim 1 and spokes 2, and this wheel is provided with a pair of hand grips, indicated as a whole by the numerals 3 and 4 fashioned in tubular form, of rubber or similar material, and located on the steering wheel at desired locations, preferably at diametrically opposite points.

Each grip is split or slit longitudinally, as at 5, to form a split sleeve, and the edges of the split are adapted to be spread apart so that the sleeve may be slipped over the rim of the wheel and be clamped about the rim for the purpose of retaining the sleeve on the rim. Due to the elasticity or resiliency of the material the sleeves are retained by friction on the wheel rim, and while the grips are grasped in the hands the added friction, due to pressure of the fingers on the grips or split sleeves, causes the split sleeves to grip the wheel rim so that the steering wheel may be turned with usual facility.

Figure 6:
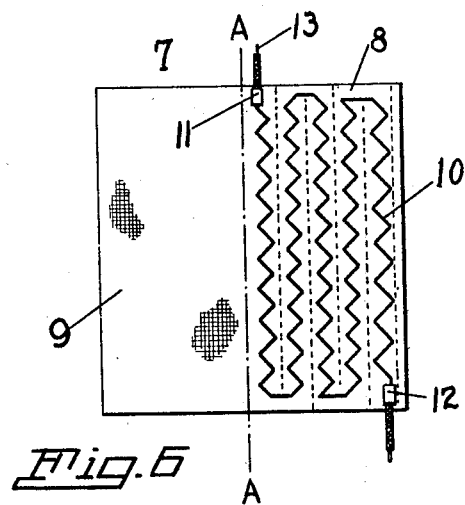
Figure 6 is a plan view of the electric heating pad with its flap unfolded, before the pad is folded and placed in the slot of the grip body.
Figure 7:
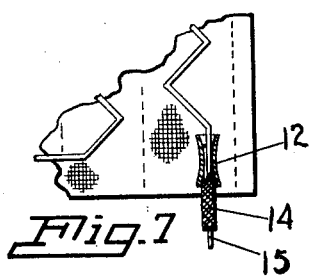
Figure 7 is a detail fragmentary view of part of the pad showing the manner of connecting detachable wires to the pad or electric heating element.

Along a central longitudinal line of the split sleeve, opposite to the split, I provide an interior slot or recess 6 in which the heating element or pad is enclosed. The heating element is indicated as a whole by the numeral 7, and it is removable from the slot or recess when required for replacement or repair. The heating element comprises a pad fashioned with a body portion 8 and a foldable flap 9, the flap being adapted to fold over the pad on the line A—A of Figure 6. The pad and flap are preferably formed of asbestos and the heating element or coil 10 is stitched on the pad, after which the flap is folded over on the pad and the whole stitched, thus providing a flat flexible unit adapted to be inserted and retained by friction in the slot of the sleeve.

At the ends of the coil are provided sockets 11 and 12, and one socket in one sleeve is connected in another socket in the other sleeve by a wire 13, plugs 14 being used at the ends of the wire for making the proper electrical connection with the sockets of the coils.

One of the heating elements is grounded as by a wire 15 to a suitable part of the automobile, as the steering post P, and a conductor wire 16 is connected to the coil of the other grip for supplying the electric current. This conductor wire is connected to a suitable source of supply for the electric current and a usual control switch is used in the heating circuit.

Figure 4:
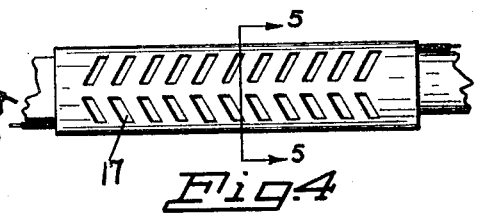
Figure 4 is a face view of one of the grips showing the heat distributing parts of the grip.
Figure 5:
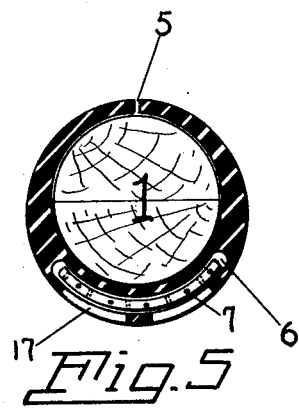
Figure 5 is an enlarged transverse sectional view as at line 5—5 of Figure 4.

As best seen in Figures 4 and 5 the sleeve is provided with two series of ports 17 communicating with the slot 6, through which ports the heated air, from contact with the heating element, pass to the exterior of the sleeve and to the fingers of the driver of the automobile.

Figure 1:
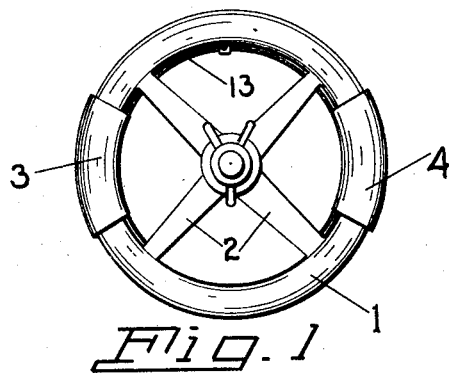
Figure 1 is a plan view of a steering wheel for an automotive vehicle, on which wheel a pair of the hand grips are illustrated.
Figure 2:
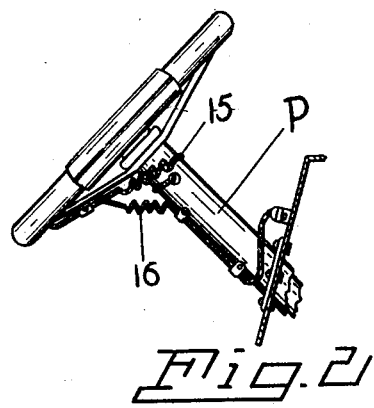
Figure 2 is a side view of the wheel with the grips thereon and showing the connections of electric wires for the electric heater.
Figure 3:
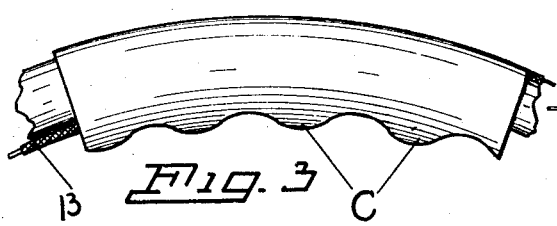
Figure 3 is an enlarged view of one of the grips of the well known corrugated or roughened type as used on the wheel rims.

In Figure 3 the sleeve is provided with corrugations at C to conform to the fingers of the drivers hand and to afford a better grip on the sleeve, and the ports 17 also provide an uneven surface for gripping the sleeve.

When heat is not required, the heat circuit may be cut off by the use of a cut out switch, and if desired the wires may be disconnected, permitting the use of the split sleeves as grips in usual manner.

Having thus fully described my invention, what I claim as new and desire to secure by Letters Patent is:—

A hand grip comprising a split sleeve of resilient material having a longitudinally extending interior slot located opposite the split portion of the sleeve and spaced outlet ports in the exterior wall of the sleeve opening from the slot, said split sleeve having complementary edges adapted to retain the hand grip in position for use, said slot forming a pocket for a foldable heating element, said heating element comprising a pad and a foldable flap on the pad for insertion in the pocket, and means for connecting electric circuit wires to the heating pad.

In testimony whereof I affix my signature.
BENNETT J. BLUE.